US010328831B2

(12) United States Patent
Takada et al.

(10) Patent No.: US 10,328,831 B2
(45) Date of Patent: Jun. 25, 2019

(54) ACOUSTIC DEVICE

(71) Applicants: CLARION CO., LTD., Saitama (JP); TACHI-S CO., LTD., Tokyo (JP)

(72) Inventors: Naoki Takada, Saitama (JP); Fumiaki Nakashima, Saitama (JP); Takao Ishikawa, Saitama (JP); Takahiko Nagasawa, Tokyo (JP); Yasuyuki Ito, Tokyo (JP)

(73) Assignees: CLARION CO., LTD., Saitama-Shi, Saitama (JP); TACHI-S CO., LTD., Akishima-Shi, Tokyo (JP)

( * ) Notice: Subject to any disclaimer, the term of this patent is extended or adjusted under 35 U.S.C. 154(b) by 0 days.

(21) Appl. No.: 15/307,889

(22) PCT Filed: May 15, 2015

(86) PCT No.: PCT/JP2015/064052
§ 371 (c)(1),
(2) Date: Oct. 31, 2016

(87) PCT Pub. No.: WO2015/198745
PCT Pub. Date: Dec. 30, 2015

(65) Prior Publication Data
US 2017/0106775 A1    Apr. 20, 2017

(30) Foreign Application Priority Data

Jun. 27, 2014 (JP) .................................. 2014-132668
Jun. 27, 2014 (JP) .................................. 2014-132670

(51) Int. Cl.
*H04R 5/02* (2006.01)
*B60N 2/879* (2018.01)
(Continued)

(52) U.S. Cl.
CPC ............... *B60N 2/879* (2018.02); *B60N 2/80* (2018.02); *H04R 1/025* (2013.01); *H04R 1/2819* (2013.01)

(58) Field of Classification Search
CPC ...... H04R 2499/13; H04R 1/02; H04R 1/028; H04R 1/025; H04R 3/00; H04R 3/12;
(Continued)

(56) References Cited

U.S. PATENT DOCUMENTS 4,490,842 A * 12/1984 Watanabe ........... B60R 11/0217
381/86
4,696,370 A * 9/1987 Tokumo ................. H04R 5/023
181/141

(Continued)

FOREIGN PATENT DOCUMENTS

CN          1042036 A      5/1990
CN        201472197 U      5/2010
(Continued)

OTHER PUBLICATIONS

International Search Report issued for corresponding PCT/JP2015/064052 application.
(Continued)

*Primary Examiner* — Leshui Zhang
(74) *Attorney, Agent, or Firm* — IP Business Solutions, LLC

(57) ABSTRACT

To make it possible to improve a low-tone reproducing ability with a simple structure in an acoustic device including speakers in a headrest. The acoustic device includes a core material of a closed structure functioning as a core of a headrest main body, acoustic speakers 50, 50 disposed in the core material, and hollow headrest stays 15, 15 that
(Continued)

pierce through the core material. The headrest stays 15, 15 circulate the air on the inside of the core material to the outer side via hollow sections.

11 Claims, 13 Drawing Sheets

(51) Int. Cl.
*B60N 2/80* (2018.01)
*H04R 1/02* (2006.01)
*H04R 1/28* (2006.01)

(58) Field of Classification Search
CPC ...... H04R 5/02; H04R 5/023; H04R 2420/07; H04R 2420/01; H04R 2430/01; G10K 15/02; G10K 15/04; G10K 11/22; G10K 11/0217; H04S 7/303; H04S 7/30; H04S 7/302; H04S 2400/11; H04S 2420/01; H04S 5/00; H04S 5/02; H04S 7/307; H04S 2400/01; H04S 3/00; H04S 3/002; H04S 2400/05; H04S 2400/07; H04S 1/00; H04S 1/007; G10L 19/008; G10L 21/0364; H04B 1/082; B60R 11/02; B60R 11/0247; B60R 2011/0017
USPC ........ 381/1, 2, 7, 10, 11, 17, 18, 19, 22, 23, 381/300, 302–308, 310, 311, 27, 28, 61, 381/77, 78, 80, 81, 85, 86, 89, 332; 340/692, 327, 384.73, 392.1, 392.4, 340/404.1; 700/94
See application file for complete search history.

(56) References Cited

U.S. PATENT DOCUMENTS

| | | |
|---|---|---|
| 6,669,285 B1 | 12/2003 | Park et al. |
| 2004/0007906 A1 | 1/2004 | Park et al. |
| 2006/0097551 A1 | 5/2006 | Park et al. |
| 2010/0148550 A1 | 6/2010 | Kidd |
| 2012/0025583 A1 | 2/2012 | Yamada |

FOREIGN PATENT DOCUMENTS

| | | | |
|---|---|---|---|
| CN | 102343849 A | | 2/2012 |
| DE | 19949935 C1 | | 11/2000 |
| JP | 57-188486 U | | 11/1982 |
| JP | 07-264689 A | | 10/1995 |
| JP | 2005-532224 A | | 10/2005 |
| JP | 2007-276568 A | | 10/2007 |
| JP | 2008-206655 A | | 9/2008 |
| JP | 2008206655 A | * | 9/2008 |
| JP | 2008-295595 A | | 12/2008 |
| JP | 2008-295597 A | | 12/2008 |
| JP | 2009-247388 A | | 10/2009 |
| JP | 2012-046158 A | | 3/2012 |
| JP | 2014091489 A | * | 5/2014 |
| WO | WO93/01951 A1 | | 2/1993 |
| WO | WO94/15815 A1 | | 7/1994 |
| WO | WO-9415815 A1 | * | 7/1994 ......... B60R 11/0217 |

OTHER PUBLICATIONS

Written Opinion of the International Search Authority issued for corresponding PCT/JP2015/064052 application.
International Preliminary Report on Patentability issued for corresponding PCT/JP2015/064052.
Written Opinion of the International Searching Authority issued for corresponding PCT/JP2015/064052.
Extended European Search Report mailed by European Patent Office dated Jan. 25, 2018 in the corresponding European patent application No. 15812128.5-1010.
Japanese Office Action mailed by Japanese Patent Office dated Feb. 27, 2018 in the corresponding Japanese patent application No. 2014-132668.
Japanese Office Action mailed by Japanese Patent Office dated Feb. 27, 2018 in the corresponding Japanese patent application No. 2014-132670.
Chinese Office Action mailed by Chinese Patent Office dated Feb. 5, 2018 in the corresponding Chinese patent application No. 201580030263.
Notification of Reasons for Refusal mailed by Japanese Patent Office dated Aug. 7, 2018 in corresponding Japanese Patent Application No. 2014-132670.

* cited by examiner

ACOUSTIC DEVICE

TECHNICAL FIELD

The present invention relates to an acoustic device.

BACKGROUND ART

There has been known an acoustic device incorporating a box-type speaker in a case member of a headrest of a seat (see, for example, Patent Literature 1).

CITATION LIST

Patent Literature

Patent Literature 1: Japanese Patent Application Laid-Open No. 2009-247388

SUMMARY OF INVENTION

Technical Problem

However, in the conventional acoustic device, since a box-like enclosure of the speaker is built in the inner side of the headrest, a large enclosure cannot be used because of limitation on a size of the headrest. A low-tone reproducing ability is deteriorated.

The present invention has been devised in view of the above described circumstances and it is an object of the present invention to make it possible to improve a low-tone reproducing ability with a simple structure in an acoustic device including speakers in a headrest.

Solution to Problem

This specification includes the entire content of Japanese Patent Application No. 2014-132670 filed on Jun. 27, 2014.

In order to attain the object, the present invention provides an acoustic device including: a core material of a closed structure functioning as a core of a headrest main body; acoustic speakers disposed in the core material; and hollow headrest stays that pierce through the core material. The headrest stays circulate the air on the inside of the core material to the outer side via hollow sections.

In the present invention, the headrest stays include communication holes for the air at ends or on side surfaces of pipe shapes.

In the present invention, the acoustic device includes an extended enclosure provided in a backrest section of a seat to which the headrest stays are connected, and the headrest stays communicate with the extended enclosure.

Further, in the present invention, the extended enclosure includes a port for discharging the air to a front surface side of the backrest section.

In the present invention, the acoustic speakers are provided as a pair on left and right, and the headrest stays are provided as a pair on the left and the right in positions close to the acoustic speakers.

In the present invention, the acoustic device includes a frame member made of metal provided on an inner side of the headrest main body, the frame member integrally includes the headrest stays connected to a backrest section of a seat, and a heat generating body is fixed to the frame member.

In the present invention, portions near the heat generating body in the headrest stays are formed small in a sectional area.

Further, in the present invention, the frame member is provided on an inner side of the core material and supports the core material, and the headrest stays cause a space on the inner side of the core material to communicate with the outer side.

In the present invention, the heat generating body is an acoustic signal processing circuit for the acoustic speakers.

In the present invention, the headrest stays cause an inside of the headrest main body to communicate with an inside of the backrest section.

Advantageous Effects of Invention

According to the present invention, it is possible to improve a low-tone reproducing ability with a simple structure in an acoustic device including speakers in a headrest.

DESCRIPTION OF EMBODIMENTS

Figure 1:
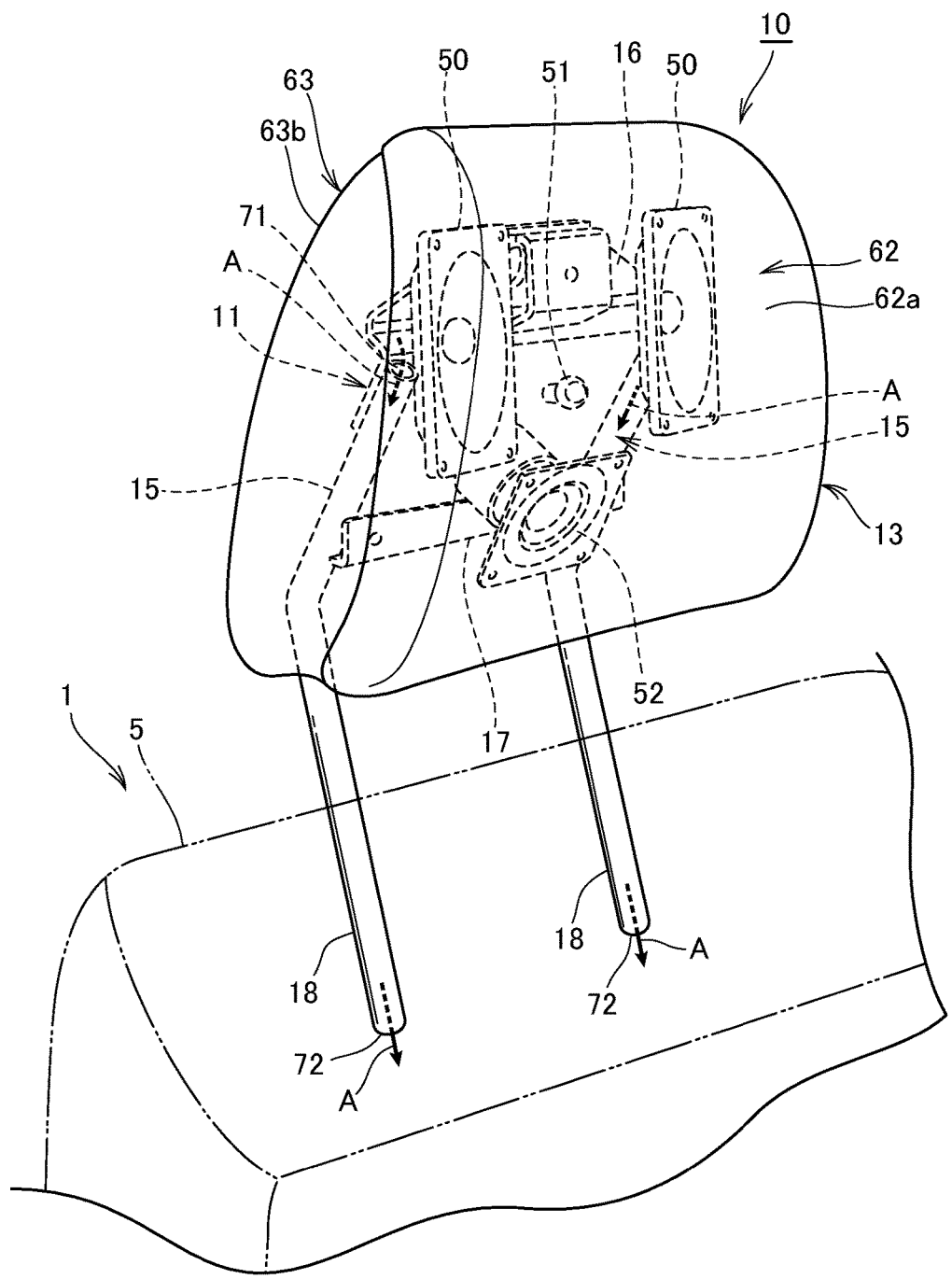
FIG. 1 is a perspective view showing a headrest device according to a first embodiment of the present invention.
Figure 2:
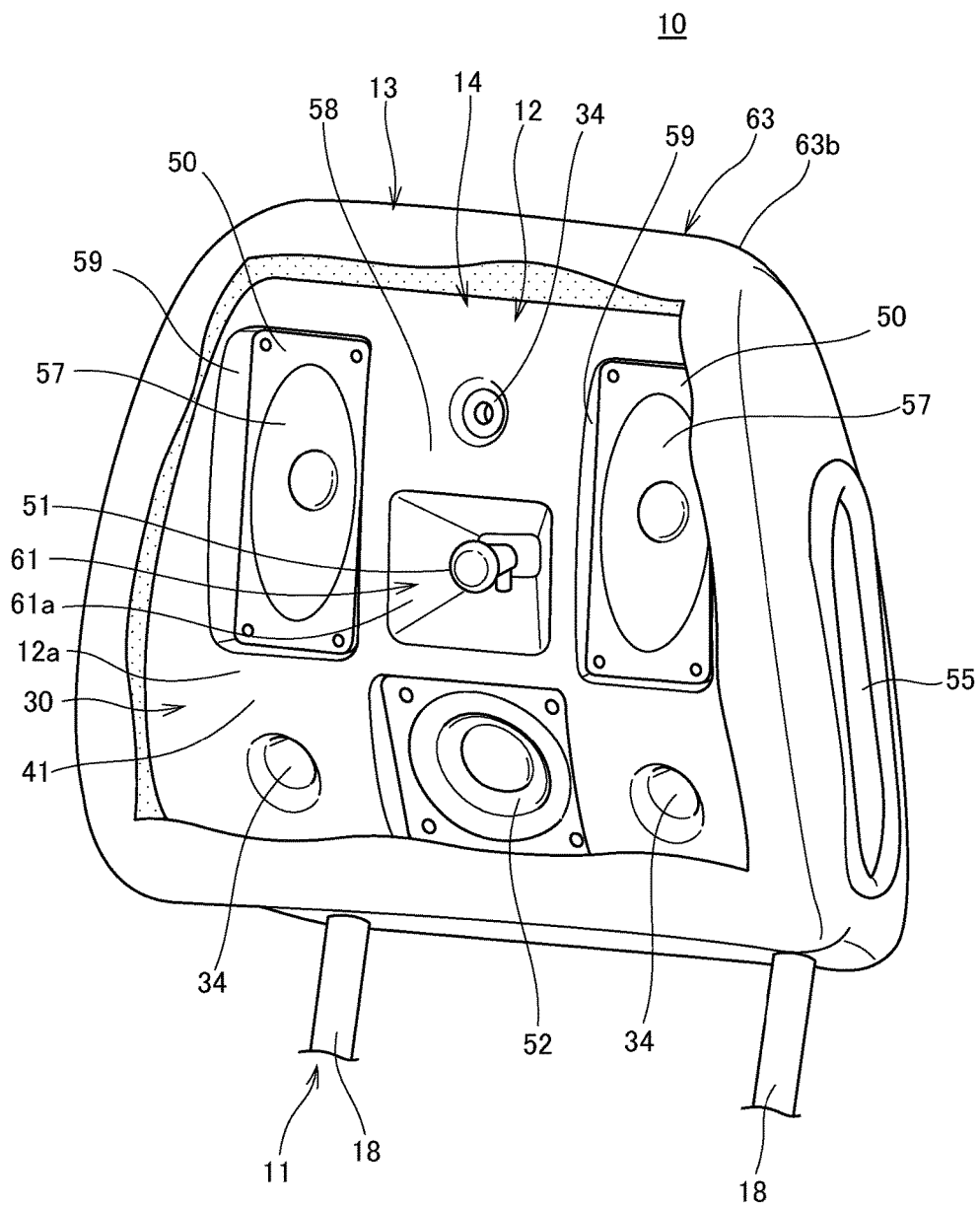
FIG. 2 is a perspective view showing the headrest device.

Embodiments of the present invention are explained below with reference to the drawings.
[First Embodiment]
FIG. 1 and FIG. 2 are perspective views showing a headrest device 10 according to a first embodiment of the present invention. In FIG. 1, illustration of a cushion core material 12 explained below is omitted. In FIG. 2, illustration of the front surface of a cushion 13 explained below is omitted.

The headrest device 10 (an acoustic device) is provided in a seat 1 for an occupant disposed in a vehicle interior. Examples of the vehicle interior include vehicle interiors of an automobile, a train, an airplane, and a ship. In the embodiment, the headrest device 10 provided in a seat 1, which is a front seat of an automobile and in which a driver is seated, is explained as an example. Examples of the automobile include, besides an ordinary four-wheeled vehicle, a small electric automobile not including side doors.

A seat 1 includes a seat surface section (not shown in the figure) on which a driver (a seated person) is seated, a backrest section 5 extending upward in a posture slightly inclining backward from the rear end of the seat surface section, and the headrest device 10 attached to the upper end of the backrest section 5.

The headrest device 10 includes an acoustic speaker 50 and an acoustic microphone 51 and includes a communication section (not shown in the figure) that enables the headrest device 10 to cooperate with other devices (not shown in the figure) such as a portable terminal through short-range radio communication. Examples of the other devices include a cellular phone, a smart phone, a tablet terminal, a car audio and an automotive navigation system. Examples of the short-range radio communication include Bluetooth (a short-range radio communication standard: registered trademark). Note that the headrest device 10 and the other devices can be connected by not only the short-range radio communication but also, for example, a wire.

In a state in which the headrest device 10 cooperates with the other devices, the headrest device 10 outputs, from the acoustic speaker 50, as sound, sound data of contents read out from the other devices, guidance sound data for guiding a vehicle to a destination, and the like. In the state in which the headrest device 10 cooperates with the other devices, the seated person can operate the other devices using, as a voice command, voice collected by the acoustic microphone 51 and make a call in a hand-free manner via the acoustic microphone 51.

The headrest device 10 includes a frame 11 (a frame member) functioning as a framework of the headrest device 10, a cushion core material 12 (a core material) functioning as a headrest main body coupled to the frame 11, and a cushion 13 provided to cover the periphery of the cushion core material 12 to receive the head of the seated person. In the first embodiment, the headrest main body is a cushion core material 12. However, the headrest main body only has to be covered with the cushion 13 of the outermost layer and may include other members in addition to the cushion core material 12.

Figure 3:
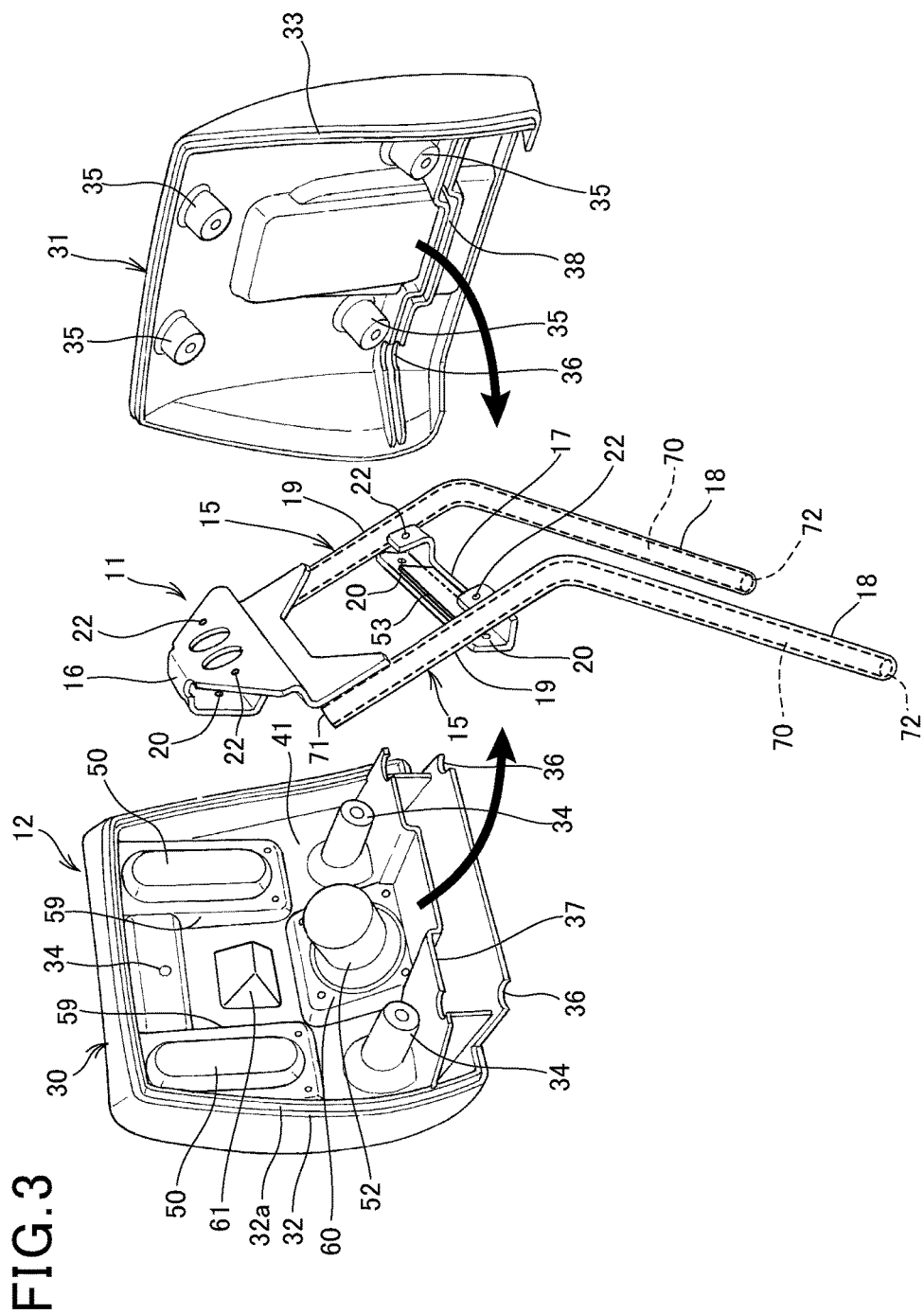
FIG. 3 is an exploded perspective view of a headrest main body.

FIG. 3 is an exploded perspective view of the cushion core material 12 and the frame 11.

The frame 11 is made of metal and integrally formed by welding a pipe material and a plate material. The frame 11 is made of, for example, a steel material.

The frame 11 includes a pair of headrest stays 15, 15 disposed side by side in the left-right direction and extending in the up-down direction, an upper cross member 16 that couples the upper end portions of the headrest stays 15, 15 to the left and right, and a lower cross member 17 that couples the headrest stays 15, 15 to the left and right below the upper cross member 16.

The headrest stays 15, 15 are formed in a hollow round pipe shape and include hollow sections 70 substantially circular in section over the entire length thereof. The headrest stays 15, 15 include stay sections 18, 18 extending upward substantially in parallel to the backrest section 5 and inner frame sections 19, 19 bent forward at the upper ends of the stay sections 18, 18 and extending upward in a slightly forward-bent posture.

The inner frame sections 19, 19 are located on the inside of the headrest device 10 on the inner side of the cushion 13. The stay sections 18, 18 are inserted into attachment hole sections (not shown in the figure) formed in the upper surface of the backrest section 5 and are fixed to the seat 1. The headrest device 10 is configured to be capable of changing a height position of attachment according to a physique or the like of the seated person by adjusting insertion depth of the stay sections 18, 18 into the attachment hole sections.

The cushion core material 12 is formed in a sealed box shape by joining a substantially box-shaped front side case 30, which is opened in the rear surface, and a substantially box-shaped rear side case 31, which is opened in the front surface, each other in the openings thereof. The cushion core material 12 is formed in a substantially rectangular parallelepiped shape long in the up-down direction and the left-right direction and short in the front-back direction. The front side case 30 and the rear side case 31 are resin molded products and configured by a resin material such as ABS resin or polypropylene resin.

The front side case 30 and the rear side case 31 respectively have joining surfaces 32, 33 in peripheral edge portions of the openings. Specifically, the joining surface 33 of the rear side case 31 fits in a groove section 32*a* formed in the joining surface 32 of the front side case 30, whereby the joining surfaces 32 and 33 are closed. A frame-like gasket (not shown in the figure) is interposed between the joining surfaces 32, 33 to improve a sealing property. The joining surfaces 32, 33 may be joined and sealed by, for example, ultrasonic welding.

A plurality of fixing hole sections 20 are provided on the front surfaces of the upper cross member 16 and the lower cross member 17. Front side case fixing bolts 21 (FIG. 5) for fixing the front side case 30 to the frame 11 are fastened to the fixing hole sections 20. A plurality of fixing hole sections 22 are provided on the rear surfaces of the upper cross member 16 and the lower cross member 17. Rear side case fixing bolts 23 (FIG. 4) for fixing the rear side case 31 to the frame 11 are fastened to the fixing hole sections 22.

The front side case 30 includes a plurality of fixing sections 34 through which the front side case fixing bolts 21 are inserted. The rear side case 31 includes a plurality of fixing sections 35 through which the rear side case fixing bolts 23 are inserted. Specifically, the fixing sections 34, 35 are formed in a bottomed cylindrical shape recessed to the inner side of the cushion core material 12. The front side case fixing bolts 21 and the rear side case fixing bolts 23 are inserted through the bottom sections of the cylindrical shape.

The front side case 30 and the rear side case 31 are disposed to hold the frame 11 from the front and the back and fit the joining surfaces 32, 33 each other and are fixed to the frame 11 by the front side case fixing bolts 21 and the rear side case fixing bolts 23 provided from the outer side. That is, an upper part of the frame 11 is located on the inside of the cushion core material 12 formed to be hollow.

The cushion core material 12 includes, in a lower part, stay pierce-through holes 36, 36 through which the stay sections 18, 18 pierce downward. A seal member (not shown in the figure) is provided between the stay pierce-through holes 36, 36 and the stay sections 18, 18. A sealing property of the inside of the cushion core material 12 is secured.

Figure 4:
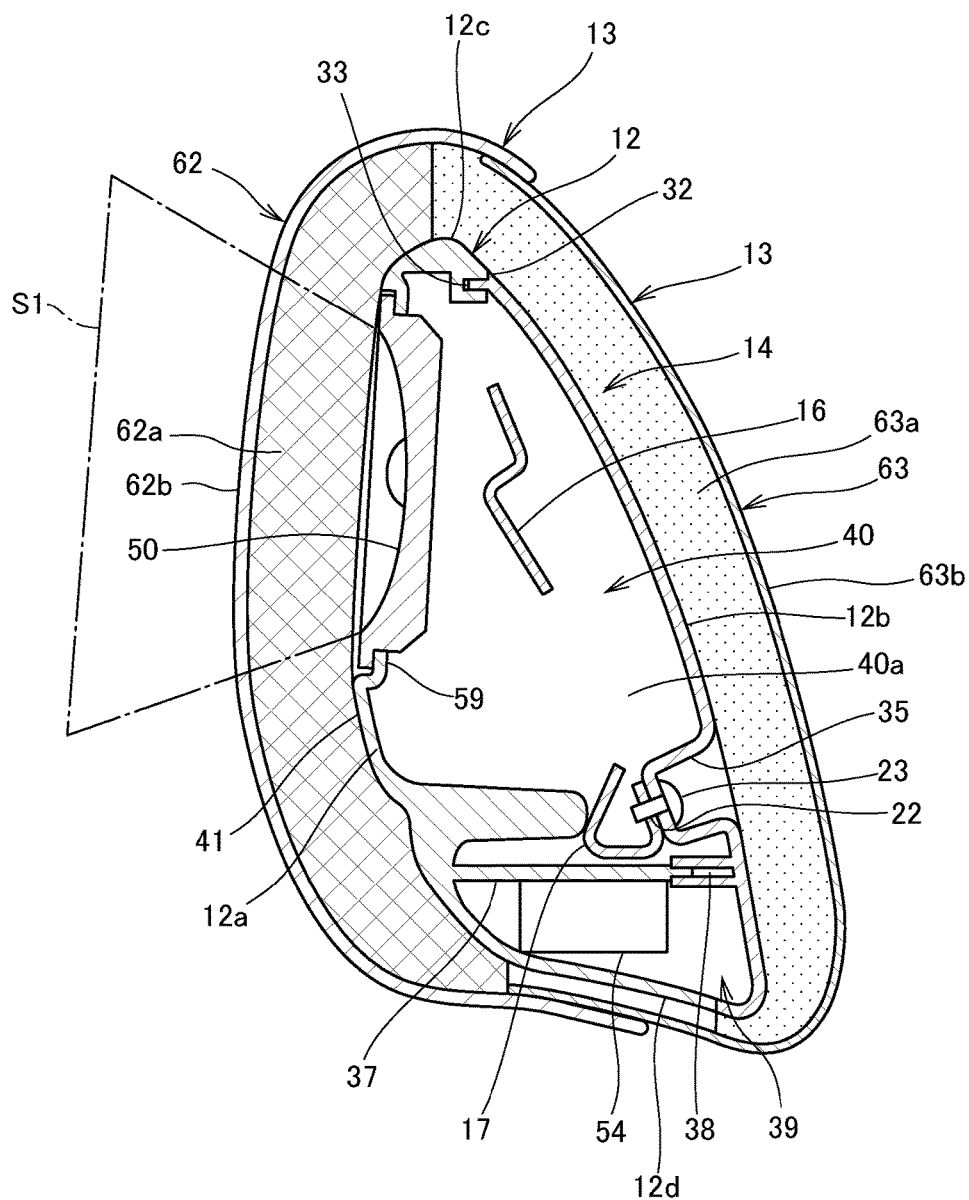
FIG. 4 is a longitudinal sectional view of the headrest device.
Figure 5:
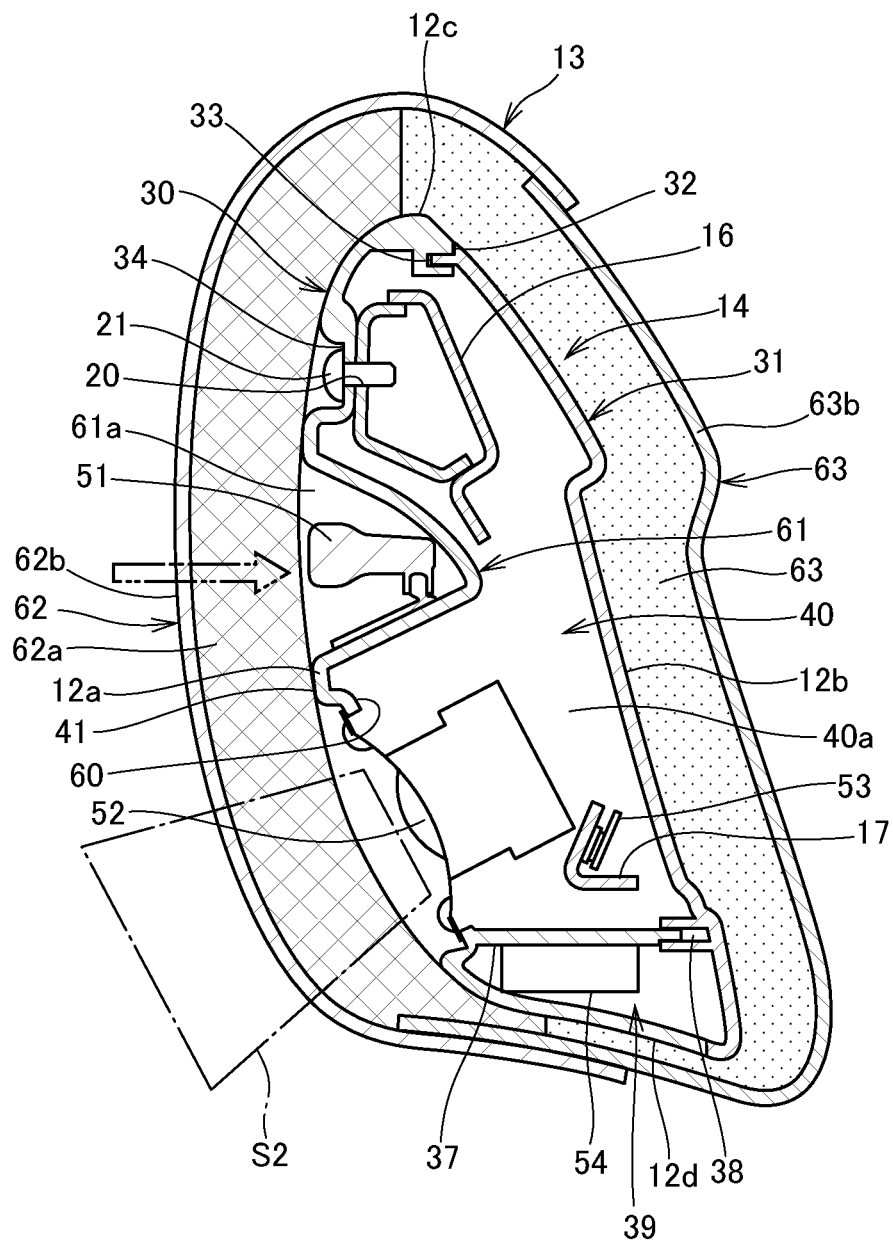
FIG. 5 is a longitudinal sectional view of the headrest device.
Figure 6:
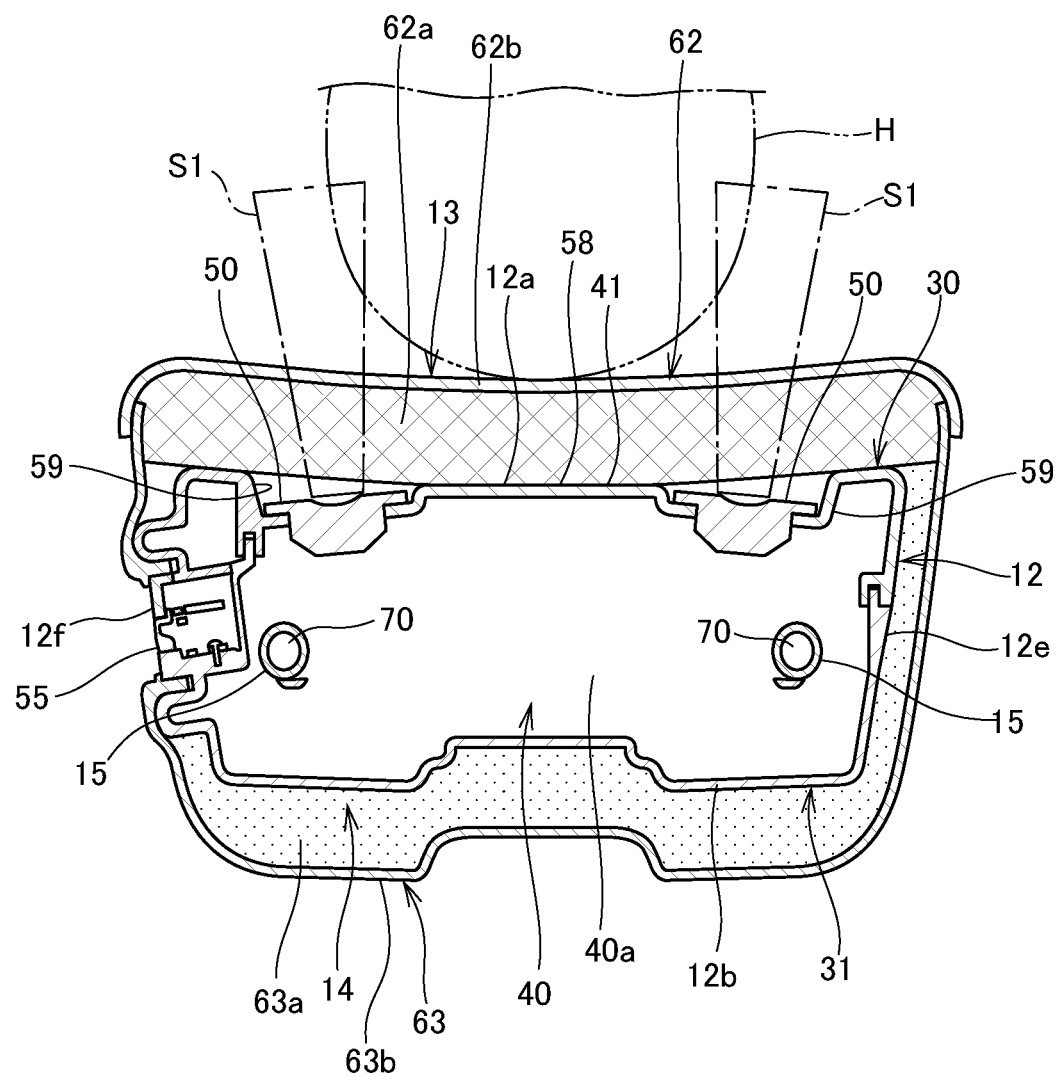
FIG. 6 is a lateral sectional view of the headrest device.

FIG. 4 is a longitudinal sectional view of the headrest device 10. FIG. 5 is a longitudinal sectional view of the headrest device 10. FIG. 6 is a lateral sectional view of the headrest device 10. In FIG. 4 and FIG. 6, a cross section of a position passing the acoustic speaker 50 is shown. In FIG. 5, a cross section of the center in the width direction of the headrest device 10 is shown.

Referring to FIG. 3 to FIG. 6, the front side case 30 includes, in a lower part of the inside, a partition plate section 37 extending substantially horizontally to the rear side case 31 side. The rear side case 31 includes, in a lower part on the inside, an engaging section 38 in which the rear end of the partition plate section 37 fits.

A space on the inside of the cushion core material 12 is partitioned into a housing section 39 in a lower part and an enclosure section 40 above the housing section 39 by the partition plate section 37. The enclosure section 40 has an inner space 40*a* wider than the housing section 39.

The cushion core material 12 includes a front surface 12*a* facing the back of the head H of the seated person, a rear surface 12*b*, a top surface 12*c*, a lower surface 12*d*, a right side surface 12*e*, and a left side surface 12*f*.

In the cushion core material 12, a pair of left and right acoustic speakers 50, 50, an acoustic microphone 51, and a sub-woofer 52 are provided. Specifically, the acoustic speakers 50, 50, the acoustic microphone 51, and the sub-woofer 52 are attached to an acoustic-device attachment surface 41, which is the front surface of the enclosure section 40, on the front surface 12*a*.

On the inner side of the cushion core material 12, a control board 53 (a heat generating body) and a secondary battery 54 for supplying electric power to the control board 53 are housed. The control board 53 is mounted with an acoustic signal processing circuit that converts a sound signal sent from the outside into a sound signal for a digital speaker and operates the acoustic speakers 50 and the sub-woofer 52, a control circuit for controlling the acoustic microphone 51, and the like. The control board 53 has a function of an amplifier.

On the left side surface 12*f* of the cushion core material 12, an interface section 55 on which connection terminals to the control board 53 and the secondary battery 54 from the outside, a power switch, and the like are disposed is provided.

The headrest device 10 includes the secondary battery 54 and is provided separately and detachably from the backrest section 5. The headrest device 10 is independently movable.

Each of the acoustic speakers 50 includes a vibration plate 57 formed in an elliptical shape (a substantial race track shape) more elongated in the up-down direction than in the left-right direction and a driving section (not shown in the figures) configured by a voice coil, a magnet, and the like to drive the vibration plate 57.

As shown in FIG. 2 and FIG. 6, the acoustic-device attachment surface 41 is a shock resistant surface that receives the back of the head H of the seated person. The acoustic-device attachment surface 41 includes a receiving surface section 58 formed substantially flat in plan view in the center in the width direction of the headrest device 10 and speaker supporting holes 59, 59 communicating with the inner side of the enclosure section 40 on the left and right sides of the receiving surface section 58. The acoustic speakers 50, 50 are fixed to be fit in the speaker supporting holes 59, 59.

As shown in FIG. 6, the acoustic speakers 50, 50 are disposed in the left and right edge portions of the acoustic-device attachment surface 41 to be located on the left and right sides of the back of the head H and are disposed such that the longitudinal direction thereof is directed to the up-down direction. The acoustic speakers 50, 50 are disposed with the vibration plate 57 directed forward to be capable of outputting sound S1 substantially horizontally and are disposed to incline outward such that the output sound S1 spread further to the left and right outer sides toward the front side.

Since the vertically-elongated acoustic speakers 50, 50 are provided in the headrest device 10 in this way, it is possible to reduce the lateral width of the headrest device 10 while keeping the size of the entire vibration plate 57. Therefore, it is possible to secure sound quality. Further, when the seated person checks the back, the headrest device 10 does not obstruct the view and rear visibility is high. The lateral width of the headrest device 10 does not increase even if the headrest device 10 includes the acoustic speakers 50, 50. Therefore, versatility is high and the headrest device 10 is applicable to various car models.

Since the acoustic speakers 50, 50 are vertically elongated, as shown in FIG. 4 and FIG. 6, the sound S1 of the acoustic speakers 50, 50 is output in a narrow range in the left-right direction and is output in a wide range in the up-down direction. That is, the directivity of the sound S1 of the acoustic speakers 50, 50 is narrow in the left-right direction and, in the up-down direction, wider than in the left-right direction.

Consequently, it is possible to output the sound S1 in a wide range in the up-down direction. It is possible to always provide the seated person with sound with high sound quality without being affected by a height position of the head of the seated person and upper and lower adjustment positions of the headrest device 10. The sound S1 less easily spreads in the left-right direction. Therefore, it is possible to provide the seated person with a personal acoustic space. It is possible to suppress sound output by the headrest device 10 from reaching a seat side next to the seated person.

Further, the acoustic speakers 50, 50 are disposed to incline outward such that the output sound S1 further spread to the left and right outer sides toward the front side. Therefore, even in a configuration in which the left and right interval of the acoustic speakers 50, 50 is reduced to reduce the headrest device 10 in size, it is possible to spread sound to the left and right to reach the ears of the seated person. It is possible to cause the seated person to feel a satisfactory stereophonic sense.

In the embodiment, the acoustic speakers 50, 50 are supported by the cushion core material 12 to use the enclosure section 40 of the sealed hollow cushion core material 12 as an enclosure that reinforces a low tone. Therefore, it is unnecessary to provide a dedicated enclosure. It is possible to simplify the structure of the acoustic speakers 50, 50. Since the cushion core material 12 including the relatively large inner space 40*a* is used as the enclosure, sound quality is high.

As shown in FIG. 3 and FIG. 5, the acoustic-device attachment surface 41 includes, in a lower part, a woofer attachment surface 60 to which the sub-woofer 52 is attached. Specifically, the woofer attachment surface 60 is provided in the center in the width direction of the cushion core material 12 below the speaker supporting holes 59, 59 and inclines to be directed front downward. The sub-woofer 52 is attached to the woofer attachment surface 60 to be directed front downward and outputs sound S2 front downward. A vibration plate of the sub-woofer 52 is driven by a driving section (not shown in the figure) controlled by the control board 53. Since the sub-woofer 52 is provided downward in this way, effects are obtained in that it is possible to transmit sound to a lower portion of the body of the seated person and cause the seated person to easily feel a low tone.

As shown in FIG. 2, FIG. 3, and FIG. 5, the receiving surface section 58 of the acoustic-device attachment surface 41 includes a sound collecting section 61 recessed toward the inner side of the enclosure section 40. The sound collecting section 61 is disposed in the center portion in the width direction of the headrest device 10 between the acoustic speakers 50, 50, disposed in the center portion in the up-down direction of the headrest device 10 above the sub-woofer 52, and located behind the back of the head H. The sound collecting section 61 is formed in a substantially conical shape tapered toward the rear end side. An axis (not shown in the figure) of the substantially conical shape of the sound collecting section 61 extends forward substantially horizontally. A sound collection opening section 61a for capturing sound into the sound collecting section 61 is formed on the front surface of the sound collecting section 61. Note that the sound collecting section 61 only has to be formed in a shape capable of collecting sound and is not limited to the substantially conical shape. The sound collecting section 61 may be formed in a shape such as a substantially pyramid shape or a substantially conical trapezoidal shape.

The acoustic microphone 51 is disposed in the center in the sound collecting section 61 to be capable of efficiently collecting sound in the acoustic microphone 51.

In this embodiment, the acoustic microphone 51 is disposed between the acoustic speakers 50, 50 and the acoustic speakers 50, 50 are disposed outward. Therefore, it is possible to prevent the sound S1 of the acoustic speakers 50, 50 from being directly received by the acoustic microphone 51. It is possible to prevent the acoustic microphone 51 from being affected by the sound S1.

Further, the sub-woofer 52 outputs the sound S2 front downward below the acoustic microphone 51. Therefore, it is possible to prevent the sound S2 from being directly received by the acoustic microphone 51. It is possible to prevent the acoustic microphone 51 from being affected by the sound S2. The sub-woofer 52 outputs the sound S2 front downward from the rear side of the back of the head H. Therefore, the sound S2 is mainly transmitted to the seated person via the body of the seated person having a volume larger than the head. Therefore, it is possible to cause the seated person to easily feel a low tone. It is possible to provide a powerful low tone.

Like the acoustic speakers 50, 50, the sub-woofer 52 is supported by the enclosure section 40 of the sealed hollow cushion core material 12. The enclosure section 40 is used as the enclosure that reinforces a low tone. Therefore, it is unnecessary to provide a dedicated enclosure. It is possible to simplify the structure of the sub-woofer 52. Since the cushion core material 12 having a relatively large inner space 40a is used as the enclosure, sound quality is high.

That is, the acoustic speakers 50, 50 and the sub-woofer 52 share the enclosure section 40 of the cushion core material 12 as the enclosure. When the acoustic speakers 50, 50 and the sub-woofer 52 are provided in the same enclosure section 40, it is conceivable that the acoustic speakers 50, 50 and the sub-woofer 52 interfere with each other and affect sound quality. However, the headrest device 10 is provided near the head and an output of sound may be relatively small. Therefore, the influence of the interference is small.

Further, the fixing sections 34 (FIG. 2), through which the front side case fixing bolts 21 are inserted, are respectively provided between the acoustic speakers 50, 50 above the acoustic microphone 51 and on the left and right sides of the sub-woofer 52 below the acoustic speakers 50, 50. Therefore, it is possible to fix, while disposing the acoustic speakers 50, 50, the acoustic microphone 51, and the sub-woofer 52 in a well-balanced state, the front side case 30 with the fixing sections 34 provided in positions where the front side case 30 can be firmly fixed. It is possible to secure a sealing property of the cushion core material 12.

As shown in FIG. 4 to FIG. 6, the cushion 13 includes a front-surface cushion section 62 that covers the front surface 12a of the cushion core material 12 and a rear-side cushion section 63 that covers the remaining surfaces of the cushion core material 12.

The rear-side cushion section 63 covers the rear surface 12b, the right side surface 12e, the left side surface 12f, a rear part of the lower surface 12d, and a rear part of the top surface 12c, which are the remaining surfaces. The front-surface cushion section 62 covers the entire front surface 12a, a front part of the lower surface 12d, and a front part of the top surface 12c. The front-surface cushion section 62 and the rear-side cushion section 63 are joined at edge portions and formed in a bag shape and are attached to the cushion core material 12 to cover the cushion core material 12.

The rear-side cushion section 63 includes two layers of a damping layer 63a formed of a material that damps sound at high efficiency and a sound blocking layer 63b formed of a material having a high sound blocking property.

The damping layer 63a is formed of resin having high sound absorption performance and a high cushion property such as urethane. As urethane, for example, urethane of an open-cell body including a porous structure is used. Consequently, a high sound absorption property is obtained.

The sound blocking layer 63b is formed of a soft resin material that is sewable and has a high damping property of vibration (sound) and a high sound blocking property. The sound blocking layer 63b is formed of, for example, elastomer. As an example, the sound blocking layer 63b is formed of olefin-based thermoplastic elastomer.

The damping layer 63a is an inner layer adhering to the rear surface 12b of the cushion core material 12. The sound blocking layer 63b is an outer layer exposed to the outer side. The outer surface of the damping layer 63a and the inner surface of the sound blocking layer 63b are joined to adhere. The damping layer 63a and the sound blocking layer 63b are integrated. The damping layer 63a is formed thicker than the sound blocking layer 63b.

That is, the rear-side cushion section 63 is formed of a material that has a cushion property of a headrest and can efficiently damp and block sound.

The front-surface cushion section 62 is a three-dimensional net cushion body formed in a three-dimensional net shape by knitting a fiber body and is a so-called fiber pad. Examples of the fiber body include a fiber body of polypropylene and a blended fiber body of polypropylene and polyethylene terephthalate. Specifically, the front-surface cushion section 62 includes a front-surface cushion section main body 62a configured by the three-dimensional net cushion body and a front-surface pad section 62b that covers the surface of the front-surface cushion section main body 62a. The front-surface pad section 62b is configured by the three-dimensional net cushion body having rougher meshes than the front-surface cushion section main body 62a.

The front-surface cushion section 62 has a high cushion property and has high sound permeability and high air permeability through a three-dimensional net structure. That is, the front-surface cushion section 62 is formed of a material that has the cushion property of a headrest and can efficiently allow sound to pass.

The sounds S1 and S2 output forward from the acoustic speakers 50, 50 and the sub-woofer 52 are output forward through the front-surface cushion section 62 having the high sound permeability. On the other hand, sound output backward from the acoustic speakers 50, 50 and the sub-woofer 52 is damped and blocked in the headrest device 10 by the rear-side cushion section 63 and hardly output to the backward outer side. Specifically, the sound output backward from the acoustic speakers 50, 50 and the sub-woofer 52 is first damped and weakened by the damping layer 63a and thereafter damped and blocked by the sound blocking layer 63b. Therefore, it is possible to effectively block sound leaking backward. Consequently, it is possible to supply the sound forward through the front-surface cushion section 62 having the high sound permeability. It is possible to reduce the sound leaking backward with the rear-side cushion section 63. Therefore, it is possible to provide the seated person with a personal acoustic space.

The substantially entire surface of the front-surface cushion section 62 is formed of a material having high sound permeability. Compared with a configuration in which sound passing holes or the like are provided in a part of the cushion, it is possible to reduce the influence of the front-surface cushion section 62 on sound. Therefore, the sound quality of the headrest device 10 is high. In the configuration in which the sound passing holes or the like are provided, it is conceivable that the sound passing holes are closed by the head. In this case, sound quality is deteriorated. On the other hand, in the embodiment, the substantially front surface of the front-surface cushion section 62 is formed of the material having the high sound permeability. The entire front-surface cushion section 62 is not closed by the head. Therefore, high sound quality is obtained. It is desirable that a portion formed of the material having the high sound permeability in the front-surface cushion section 62 is provided over a region wider than a region of a projected section where the head is projected on the front-surface cushion section 62 side in front view. That is, it is desirable that the portion formed of the material having the high sound permeability in the front-surface cushion section 62 is provided to a range not hidden by the head in front view in a state in which the head is in contact with the headrest device 10.

A configuration for further reinforcing a low-tone reproducing ability for sound output by the headrest device 10 is explained.

As shown in FIG. 1, FIG. 3, and FIG. 6, the headrest stays 15, 15 are formed in a hollow pipe shape over the entire length thereof and respectively include the hollow sections 70 that pierce through the headrest stays 15, 15 in the axial direction. The hollow sections 70 include upper openings 71 (communication holes) opened in the enclosure section 40 and lower openings 72 (communication holes) opened on the outer side of the cushion core material 12. The lower openings 72 are opened on the inside of the backrest section 5.

In this embodiment, the upper openings 71 are located at the upper ends of the headrest stays 15, 15. The lower openings 72 are located at the lower ends of the headrest stays 15, 15.

That is, an inner space 40a of the enclosure section 40 and a space on the outer side of the enclosure section 40 communicate via the hollow sections 70 of the headrest stays 15, 15.

When the acoustic speakers 50, 50 and the sub-woofer 52 are driven, air A in the enclosure section 40 is pushed out by vibration of the acoustic speakers 50, 50 and the sub-woofer 52. Specifically, as shown in FIG. 1, the air A enters the hollow sections 70 from the upper openings 71 of the headrest stays 15, 15 and flows out to the outer side from the lower openings 72 through the hollow sections 70. Therefore, it is possible to use the headrest stays 15, 15 as so-called bass reflex ducts. It is possible to reinforce the low-tone reproducing ability of the acoustic speakers 50, 50 and the sub-woofer 52 without providing a dedicated duct.

Note that the positions of the upper openings 71 and the lower openings 72 are not limited to the upper ends and the lower ends of the headrest stays 15, 15. The upper openings 71 and the lower openings 72 only have to be provided in positions where an excellent acoustic characteristic can be obtained. The positions and the sizes of the upper openings 71 and the lower openings 72 are set such that the excellent acoustic characteristic can be obtained taking into account the capacity of the enclosure section 40, the sizes and the abilities of the acoustic speakers 50, 50, and the like. For example, instead of the upper openings 71 and the lower openings 72, upper openings and lower openings provided on side surfaces of the headrest stays 15, 15 and communicating with the hollow sections 70 can be respectively provided. In this case, the distance between the upper openings and the lower openings may be adjusted such that the excellent acoustic characteristic can be obtained. According to a required acoustic characteristic, the upper opening 71 and the lower opening 72 may be provided in only one of the headrest stays 15, 15 and only one headrest stay 15 may be used as the bass reflex duct.

The upper openings 71, 71 are respectively disposed in positions overlapping the acoustic speakers 50, 50 in front view, and are respectively located behind the acoustic speakers 50, 50. Therefore, it is possible to direct the flow of air due to driving of the left and right acoustic speakers 50, 50 to the hollow sections 70, 70 via the left and right upper openings 71, 71 in a well-balanced state. It is possible to reinforce the low tone in a well-balanced state of the left and the right.

A configuration for efficiently cooling the control board 53 is explained.

Figure 7:
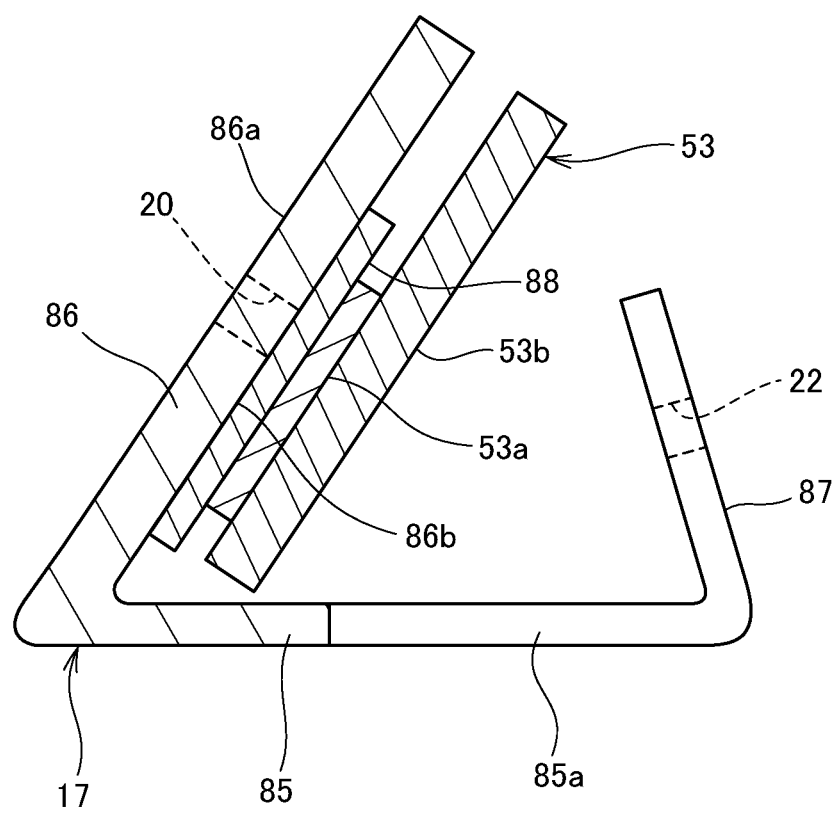
FIG. 7 is an enlarged view of a peripheral section of a lower cross member in FIG. 5.

FIG. 7 is an enlarged view of a peripheral section of the lower cross member 17 in FIG. 5.

Referring to FIG. 3, FIG. 5, and FIG. 7, the lower cross member 17 is formed in a bar shape that connects the headrest stays 15, 15 to the left and the right. The lower cross member 17 is formed by bending a plate material in a substantial L shape. The lower cross member 17 includes a lateral plate section 85 extending substantially horizontally and a longitudinal plate section 86 extending upward from one end of the lateral plate section 85 in sectional view perpendicular to the longitudinal direction of the lower cross member 17.

The longitudinal plate section 86 inclines to the other end side of the lateral plate section 85 with respect to the vertical direction. An angle formed by the lateral plate section 85 and the longitudinal plate section 86 is smaller than 90°.

The lateral plate section 85 includes, respectively at both ends in the longitudinal direction, fixing plate sections 87 extending upward from the other end. The fixing hole sections 22 are formed in the fixing plate sections 87. The lateral plate section 85 includes, between the fixing plate sections 87, 87, a cutout section 85a formed by cutting out the lateral plate section 85 from the other end side.

The longitudinal plate section 86 includes the fixing hole sections 20 respectively at both ends in the longitudinal direction. The longitudinal plate section 86 includes an outer side surface 86a facing the front surface side of the headrest device 10 and an inner side surface 86b on the back side of the outer side surface 86a.

Both end portions in the longitudinal direction of the lower cross member 17 are respectively welded to the headrest stays 15, 15 via the other end of the lateral plate section 85 and the upper end of the longitudinal plate section 86.

The control board 53 includes an LSI 53a, which is an integrated circuit, and a substrate 53b that supports the LSI 53a. The control board 53 is provided between the fixing hole sections 20, 20 on the inner side surface 86b.

The control board 53 is attached to the inner side surface 86b via a heat conduction member 88 provided between the inner side surface 86b of the lower cross member 17 and the LSI 53a. As the heat conduction member 88, a sheet-like member configured by a material having high heat conductivity or thermal grease can be used.

Heat of the control board 53 is transmitted to the lower cross member 17 via the heat conduction member 88, further transmitted from the lower cross member 17 to the headrest stays 15, 15 and the upper cross member 16, and radiated into the air from the entire frame 11. That is, since the frame 11 made of metal and having high heat dissipation is used as a heat radiating member of the control board 53, it is possible to efficiently radiate the heat of the control board 53 with a simple configuration without adding an exclusive heat radiation plate or the like. In particular, since lower parts of the headrest stays 15, 15 extend to the outer side of enclosure section 40, it is possible to efficiently radiate heat. Since the exclusive heat radiation plate or the like is not added, it is possible to secure a large capacity of the inner space 40a of the enclosure section 40. A low-tone reproducing ability is high.

Note that, in the first embodiment, the control board 53 is provided on the inner side of the enclosure section 40. However, when the control board 53 is provided on the inner side of the cushion 13 in a configuration not including the enclosure section 40, if the control board 53 is provided in contact with the frame 11, the heat of the control board 53 can be efficiently radiated by heat conduction via the frame 11.

The air A (FIG. 1) in the inner space 40a of the enclosure section 40 is discharged to the outer side from the lower openings 72 through the hollow sections 70 of the headrest stays 15, 15. Therefore, it is possible to discharge the air heated by the heat radiation of the control board 53 to the outer side via the hollow sections 70. It is possible to efficiently radiate the heat of the control board 53 with a simple configuration.

Since the heat conduction member 88 is set in contact with the LSI 53a, it is possible to efficiently transmit heat of the LSI 53a to the lower cross member 17.

Further, when the seated person leans against the backrest section 5, the cushion of the backrest section 5 is deformed. A part of an air flow generated by the deformation flows from the lower openings 72 to the hollow sections 70, flows into the inner space 40a, and cools the control board 53. Therefore, it is possible to efficiently cool the control board 53 using the air flow generated by the movement of the seated person.

Figure 8:
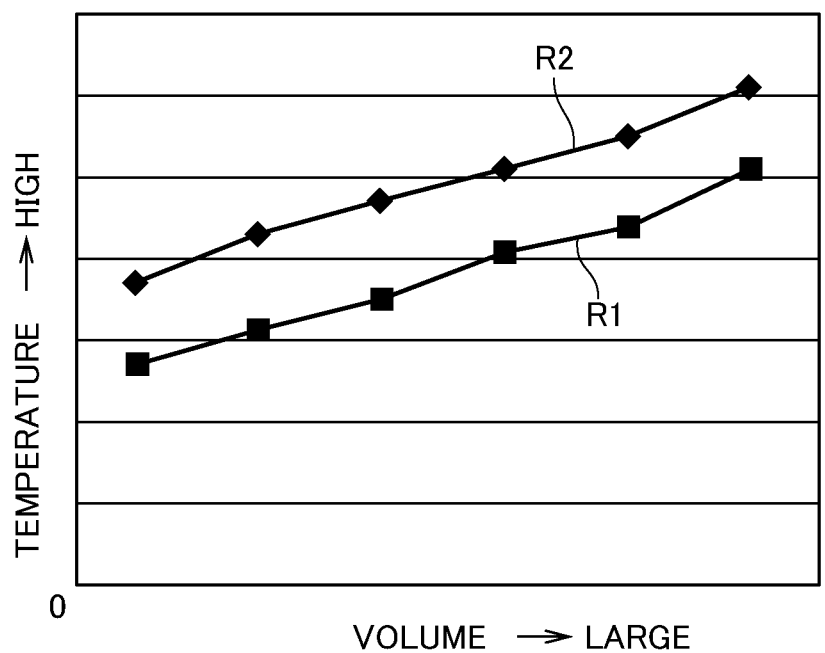
FIG. 8 is a graph showing a relation between the volume of sound of the headrest device and the temperature of a control board.

FIG. 8 is a graph showing a relation between the volume of sound of the headrest device 10 and the temperature of the control board 53. In FIG. 8, a result R1 obtained when the control board 53 is attached to the inner side surface 86b via the heat conduction member 88 and a result R2 obtained when the control board 53 is provided in the inner space 40a without being set in contact with the frame 11 are shown.

As shown in FIG. 8, an electric current required by the acoustic speakers 50, 50 and the like is larger as the volume of sound is larger, the temperature of the control board 53 increases according to an increase in the volume.

In this embodiment, since the control board 53 is attached to the lower cross member 17, the temperature was able to be lowered by approximately 20° C. irrespective of the magnitude of the volume compared with when the control board 53 is not set in contact with the frame 11.

Vibration of the acoustic speakers 50, 50 and the like is larger as the volume is larger. A flow rate of the air A flowing in the hollow sections 70 to be discharged also increases. That is, in this embodiment, as the volume of sound increases, the flow rate of the air A naturally increases and an ability of radiating the heat of the control board 53 increases. Therefore, it is possible to efficiently radiate the heat of the control board 53.

As explained above, according to the first embodiment applied with the present invention, the headrest device 10 includes the cushion core material 12 of a closed structure, the acoustic speakers 50, 50 disposed in the cushion core material 12, and the hollow headrest stays 15, 15 that pierce through the cushion core material 12. The headrest stays 15, 15 circulate the air on the inside of the cushion core material 12 to the outer side via the hollow sections 70. Consequently, the headrest stays 15, 15 can be used as ducts for improving the low-tone reproducing ability. It is possible to improve the low-tone reproducing ability with a simple structure.

The headrest stays 15, 15 include the upper openings 71, 71 and the lower openings 72, 72, which are communication holes for the air, at upper ends and lower ends of pipe shapes. Therefore, it is possible to optimize an acoustic characteristic with a simple configuration by setting the positions of the upper openings 71, 71 and the lower openings 72, 72 according to a requested characteristic.

The acoustic speakers 50, 50 are provided as a pair on the left and the right. The headrest stays 15, 15 are provided as a pair on the left and the right in positions close to the acoustic speakers 50, 50. Therefore, it is possible to improve the low-tone reproducing ability of the left and right acoustic speakers 50, 50 in a well-balanced state.

Further, the lower openings 72, 72 are opened in the backrest section 5 apart from the ears of the seated person. Therefore, it is possible to suppress sound of air flows discharged from the lower openings 72, 72 from being heard by the seated person. Therefore, it is possible to reduce noise and improve sound quality.

According to the first embodiment applied with the present invention, the headrest device 10 includes the frame 11 made of metal provided on the inner side of the headrest device 10. The frame 11 integrally includes the headrest stays 15, 15 connected to the backrest section 5 of the seat 1. The control board 53 functioning as the heat generating body is fixed to the frame 11. Therefore, it is possible to efficiently radiate the heat of the control board 53 to the outer side via the frame 11 made of metal including the headrest stays 15, 15.

The headrest stays 15, 15 are configured hollow. The headrest stays 15, 15 circulate the air on the inside of the headrest device 10 to the outer side via the hollow sections 70, 70. Therefore, it is possible to efficiently radiate the heat of the control board 53 to the outer side with the air A flowing to the outer side from the hollow sections 70, 70.

Further, the frame 11 is provided on the inner side of the cushion core material 12 of the closed structure and supports the cushion core material 12. The headrest stays 15, 15 cause the inner space 40a on the inner side of the cushion core material 12 to communicate with the outer side. Therefore, it is possible to circulate the air in the inner space 40a on the inner side of the cushion core material 12 of the closed structure to the outer side from the hollow sections 70, 70. It is possible to efficiently radiate the heat of the control board 53 to the outer side.

The acoustic speakers 50, 50 are provided in the cushion core material 12. It is possible to output sound from the headrest device 10. It is possible to facilitate the circulation of the air A in the hollow sections 70, 70 with a flow of the air by outputs of the acoustic speakers 50, 50. Therefore, it is possible to efficiently radiate the heat of the control board 53 to the outer side.

The control board 53 is the acoustic signal processing circuit for the acoustic speakers 50, 50. Therefore, it is possible to efficiently radiate generated heat of the acoustic signal processing circuit with the air A flowing to the outer side from the hollow sections 70, 70.

The headrest stays 15, 15 cause the inner space 40a of the cushion core material 12 to communicate with the inside of the backrest section 5. Therefore, it is possible to facilitate the circulation of the air in the hollow sections 70, 70 with a flow of the air in the backrest section 5 due to, for example, deformation of the backrest section 5. Therefore, it is possible to efficiently radiate the heat of the control board 53 to the outer side.

[Second Embodiment]

A second embodiment applied with the present invention is explained with reference to FIG. 9 and FIG. 10. In the second embodiment, portions configured the same as the portions in the first embodiment are denoted by the same reference numerals and signs and explanation of the portions is omitted.

In the first embodiment, the control board 53 is explained as being provided in the lower cross member 17. The second embodiment is different from the first embodiment in that the control board 53 is provided in a frame 311 not including the lower cross member 17.

Figure 9:
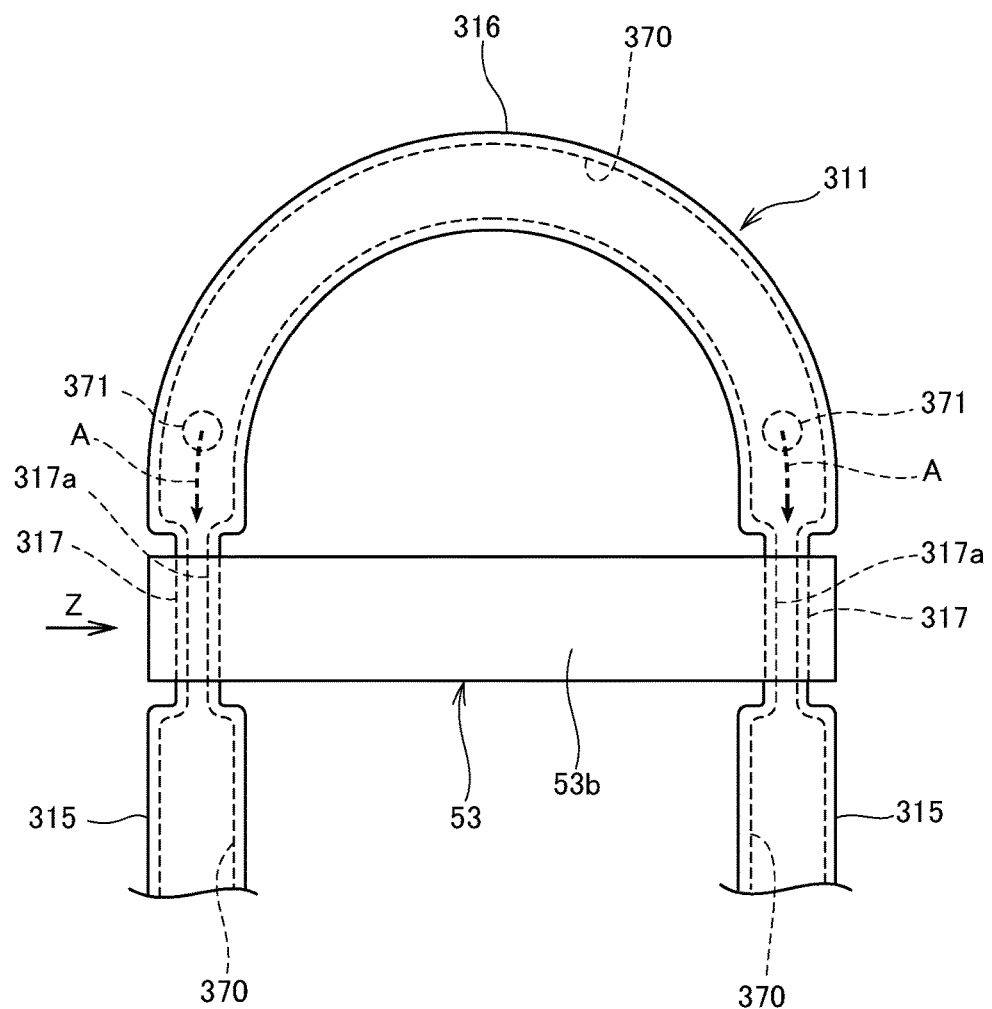
FIG. 9 is a front view showing an upper part of a frame in a second embodiment.

FIG. 9 is a front view showing an upper part of the frame 311 in the second embodiment.

The upper part of the frame 311 (a frame member) is located on the inner side of the cushion core material 12. The cushion core material 12 is supported by the frame 311.

The frame 311 is formed by bending a hollow round pipe made of metal in a substantial U shape. The frame 311 includes a pair of headrest stay sections 315, 315 (headrest stays) extending substantially vertically and a bent section 316 having a semicircular arcuate shape that connects the headrest stay sections 315, 315. The frame 311 includes a hollow section 370 extending over the entire length thereof.

The headrest stay sections 315, 315 include, at lower end portions, not-shown lower openings (communication holes) that cause the hollow section 370 to communicate with the outer side. The headrest stay sections 315, 315 include, at upper end portions, upper openings 371 (communication holes) that cause the hollow section 370 to communicate with the outer side. The upper openings 371 are opened to the inner space 40a.

The headrest stay sections 315, 315 include, in halfway portions, small diameter sections 317, 317, the outer diameter of which is formed smaller than the outer diameter of the headrest stay sections 315, 315 around the small diameter sections 317, 317. The inner diameter of hollow sections 317a, 317a of the small diameter sections 317, 317 is smaller than the inner diameter of the hollow section 370 of the headrest stay sections 315, 315 around the small diameter sections 317, 317. That is, the sectional area of the hollow sections 317a, 317a is smaller than the sectional area of the hollow section 370 around the hollow sections 317a, 317a. Therefore, flow speed of the air flowing in the hollow sections 317a, 317a is higher than flow speed of the air flowing in the hollow section 370 around the hollow sections 317a, 317a.

The control board 53 is provided astride the left and right headrest stay sections 315, 315. Specifically, both end portions in the longitudinal direction of the control board 53 are attached to the small diameter sections 317, 317.

Figure 10:
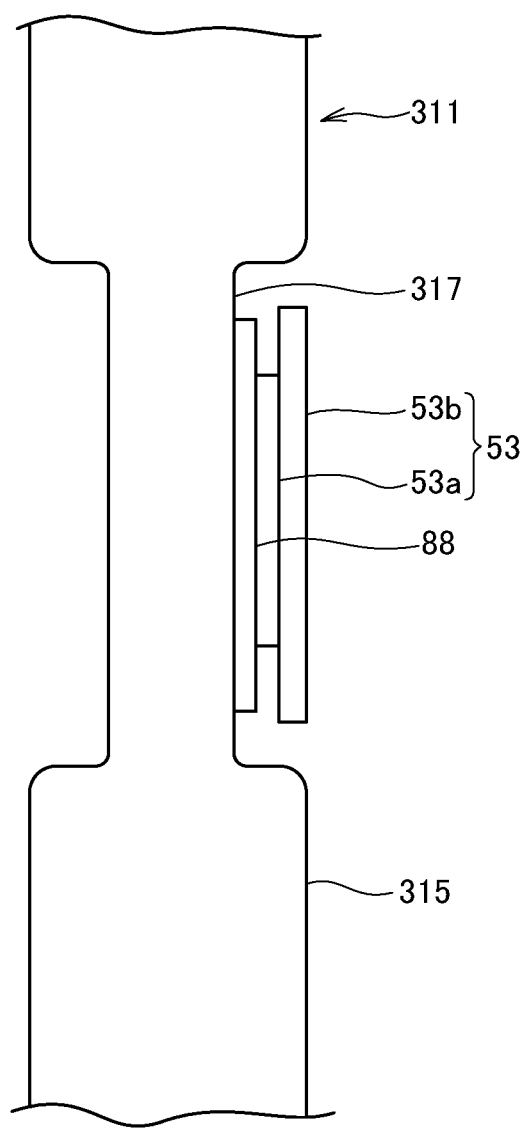
FIG. 10 is a Z arrow view in FIG. 9.

FIG. 10 is a Z arrow view of FIG. 9.

The control board 53 is attached to the small diameter sections 317, 317 via the heat conduction member 88 provided between the outer circumferential surfaces of the small diameter sections 317, 317 and the LSI 53a.

In the second embodiment, in the small diameter sections 317, 317, which are portions near the control board 53 in the headrest stay sections 315, 315, the sectional area of the hollow sections 317a, 317a is formed smaller than the sectional area of portions around the hollow sections 317a, 317a. Therefore, it is possible to increase the flow speed of the air flowing in the hollow sections 317a, 317a near the control board 53. Therefore, it is possible to efficiently radiate the heat of the control board 53 to the outer side.

The control board 53 is disposed in the small diameter sections 317, 317 recessed to the inner side. Therefore, it is possible to compactly dispose the control board 53.

Further, the headrest stay sections 315, 315 are used as bass reflex ducts. Therefore, it is possible to reinforce a low tone.

Note that the headrest stay sections 315, 315 may be set to substantially the same diameter over the entire length without providing the small diameter sections 317, 317 in the headrest stay sections 315, 315. In this case, the control board 53 is attached to the outer circumferential sections of the headrest stay sections 315, 315 via the heat conduction member 88.

Small diameter sections smaller than the outer diameter of the headrest stays 15, 15 around the small diameter sections may be provided halfway in the headrest stays 15, 15 in the first embodiment. The sectional area of hollow sections of the small diameter sections may be set small. In this case, by providing the small diameter sections near both end portions of the control board 53, it is possible to increase the flow speed of the air flowing in the hollow sections near the control board 53. It is possible to improve efficiency of heat radiation.

In the second embodiment, the headrest stay sections 315, 315 are explained as including, in the halfway portions, the small diameter sections 317, 317, the outer diameter of which is formed smaller than the outer diameter of the headrest stay sections 315, 315 around the small diameter sections 317, 317. However, the present invention is not limited to this. For example, instead of the small diameter sections 317, 317, the halfway portions of the headrest stay sections 315, 315 may be recessed by pressing or the like to provide planar portions. The control board 53 may be disposed in the planar portions. That is, the planar portions have a semi-cylindrical shape in sectional view. By attaching the control board 53 to the planar portions having the semi-cylindrical shape, it is possible to increase a contact area of the headrest stay sections 315, 315 and the control board 53. It is possible to efficiently transmit the heat of the control board 53 to the headrest stay sections 315, 315.

[Third Embodiment]

A third embodiment applied with the present invention is explained below with reference to FIG. 11. In the third embodiment, portions configured the same as the portions in the first embodiment are denoted by the same reference numerals and signs and explanation of the portions is omitted.

In the third embodiment, communication holes for the air are provided in positions different from the positions in the first embodiment.

Figure 11:
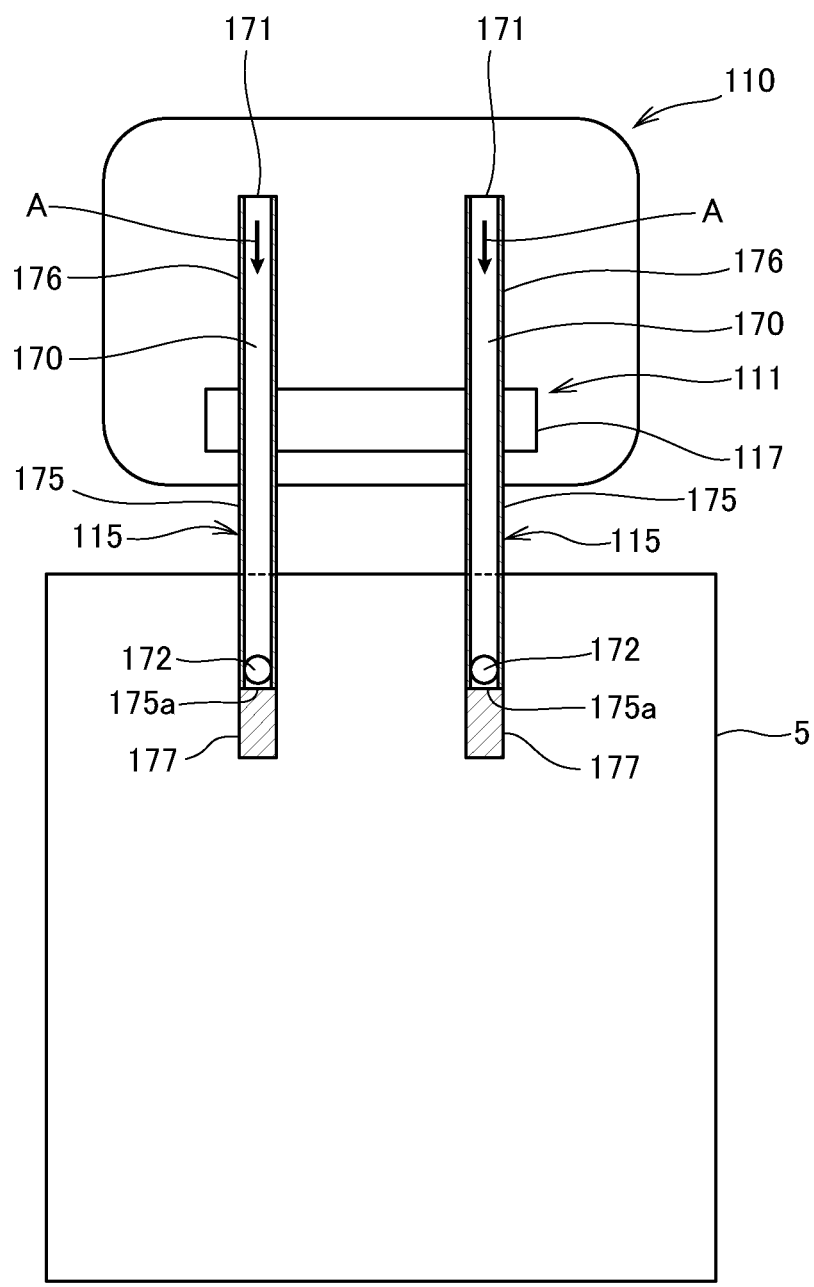
FIG. 11 is a diagram showing a configuration of a frame in a third embodiment.

FIG. 11 is a diagram showing the configuration of a frame 111 in the third embodiment.

A headrest device 110 includes the frame 111 instead of the frame 11.

The frame 111 includes headrest stays 115, 115 inserted into attachment hole sections (not shown in the figure) formed on the upper surface of the backrest section 5 and a cross member 117 that couples the upper end portions of the headrest stays 115, 115 to the left and the right on the inner side of the enclosure section 40 (FIG. 4).

The headrest stays 115, 115 respectively include stay main bodies 175 having a hollow pipe shape, hollow extended pipe sections 176 coupled to the upper ends of the stay main bodies 175, and lid members 177 that close the lower ends of the stay main bodies 175. The stay main bodies 175 and the cross member 117 are made of metal. The extended pipe sections 176 and the lid members 177 are made of resin lighter than the material of the stay main bodies 175.

The cross member 117 is provided in the extended pipe sections 176. The stay main bodies 175 and the extended pipe sections 176 are connected and integrated and include hollow sections 170 extending over the entire lengths thereof. The extended pipe sections 176 include, at upper ends, upper openings 171 (communication holes) opened in the enclosure section 40. That is, since the extended pipe sections 176 are added to the stay main bodies 175, opening positions of each of the headrest stays 115, 115 are moved upward. Since the extended pipe sections 176 are made of resin and light, it is possible to adjust the positions of the upper openings 171 without greatly increasing weight.

Openings 175a at the lower ends of the stay main bodies 175 are closed by the lid members 177. The stay main bodies 175 include, on side surfaces above the openings 175a, side surface openings 172 (communication holes) communicating with the hollow sections 170. The side surface openings 172 are opened to the inside of the backrest section 5. That is, since the openings 175a at the lower ends of the stay main bodies 175 are closed by the lid members 177 and the side surface openings 172 are provided above the openings 175a, the positions of openings on the lower end sides of the hollow sections 170 are moved upward. Since the lid members 177 are made of resin and light, the weight of each of the headrest stays 115, 115 is not greatly increased.

In this way, by adding the extended pipe sections 176 and the lid members 177 to the stay main bodies 175, it is possible to provide the upper openings 171 and the side surface openings 172 in any positions where an acoustic characteristic is excellent. Note that the extended pipe sections 176 and the lid members 177 do not need to be simultaneously used and can be independently used according to a necessary acoustic characteristic.

In the third embodiment, the upper openings 171 and the side surface openings 172 are explained as an example of the communication holes. However, the communication holes are not limited to this. At least a pair of communication holes only has to be provided on the inner side of the enclosure section 40 and the outer side of the enclosure section 40. The positions of the communication holes are set in any positions according to an acoustic characteristic, limitation on a disposition space, and the like. That is, a pair of communication holes may be provided on the side surfaces of the headrest stays 115, 115. Alternatively, the communication holes may be provided at the ends and on the side surfaces of the headrest stays 115, 115.

[Fourth Embodiment]

A fourth embodiment applied with the present invention is explained below with reference to FIG. 12 and FIG. 13. In the fourth embodiment, portions configured the same as the portions in the first embodiment are denoted by the same reference numerals and signs and explanation of the portions is omitted.

The fourth embodiment is different from the first embodiment in that an extended enclosure 281 communicating with the lower openings 72 of the headrest stays 15, 15 is provided in the backrest section 5.

Figure 12:
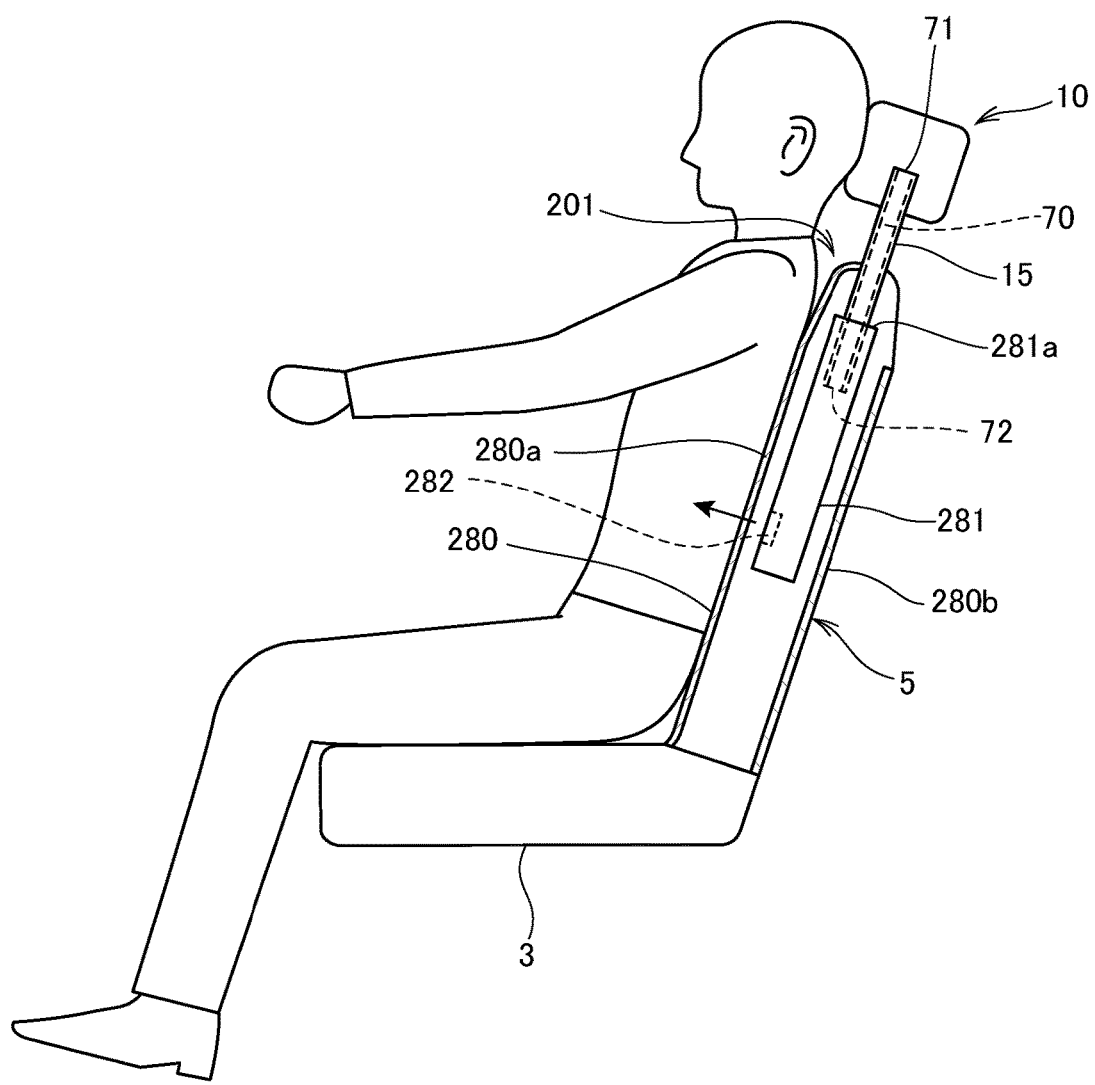
FIG. 12 is a schematic diagram showing a structure of a seat according to a fourth embodiment.
Figure 13:
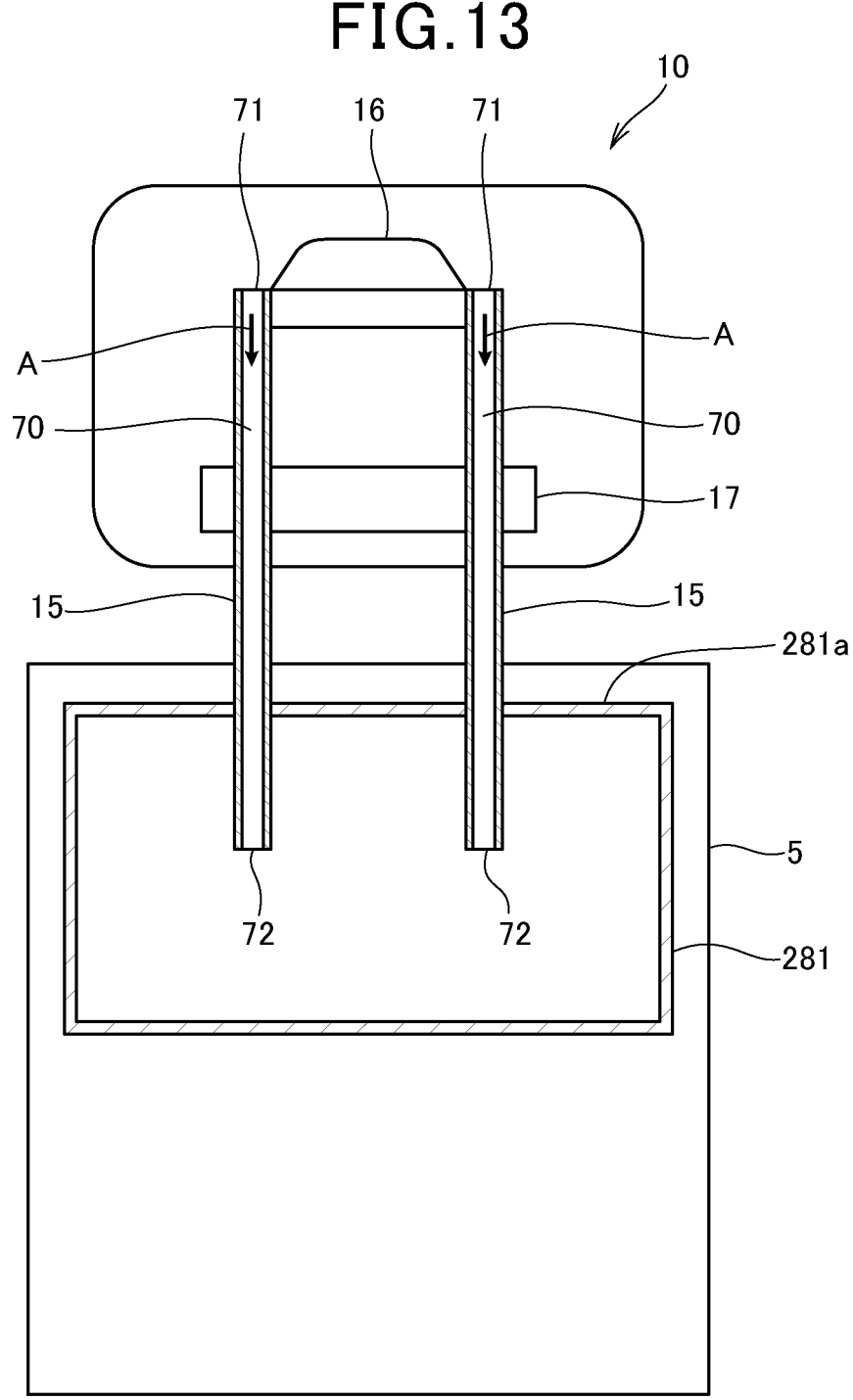
FIG. 13 is a diagram showing the internal configuration of the seat.

FIG. 12 is a schematic diagram showing the structure of a seat 201 according to the fourth embodiment. FIG. 13 is a diagram showing the internal configuration of the seat 201.

The seat 201 (an acoustic device) functioning as an acoustic device includes a seat surface section 3, the backrest section 5, and the headrest device 10.

The backrest section 5 includes a seat frame (not shown in the figures), a cushion (not shown in the figures) provided around the seat frame, and a cover member 280 that covers the cushion.

The cover member 280 includes a backrest front surface section 280a provided on substantially the entire front surface of the backrest section 5 and in contact with the back of a seated person and a backrest rear surface section 280b.

The backrest front surface section 280a is configured by a material such as resin or a cloth having high air permeability. The backrest rear surface section 280b is configured by a material such as, wood, cork, or resin having air permeability lower than the air permeability of the backrest front surface section 280a (having sound permeability lower than the sound permeability of the backrest front surface section 280a).

The box-like extended enclosure 281 is provided on the inside of the backrest section 5. The extended enclosure 281 is disposed to be embedded in the inside of the cushion. The extended enclosure 281 includes, on the front surface facing the backrest front surface section 280a, a port 282 for discharging the air on the inside to the seated person side.

The headrest stays 15, 15 of the headrest device 10 are connected to the extended enclosure 281.

Specifically, the headrest stays 15, 15 pierce through an upper surface 281a of the extended enclosure 281 and intrude into an inner space of the extended enclosure 281. The lower openings 72 of the headrest stays 15, 15 are opened to the inner space of the extended enclosure 281.

That is, the inner space 40a of the enclosure section 40 and the inner space of the extended enclosure 281 communicate via the hollow sections 70 of the headrest stays 15, 15.

The air discharged from the enclosure section 40 by the driving of the acoustic speakers 50, 50 and the sub-woofer 52 flows into the extended enclosure 281 through the hollow sections 70 and is discharged to the seated person side in the front from the port 282.

Therefore, it is possible to expand the capacity of the enclosure of the acoustic device by the extended enclosure 281 and reinforce a low tone. It is possible to directly blow an air flow associated with the driving of the acoustic speakers 50, 50 against the seated person. It is possible to cause the seated person to easily feel a low tone. Note that the capacity of the enclosure can be expanded and the low tone can be reinforced simply by providing the extended enclosure 281. Therefore, the port 282 does not have to be provided.

Further, the backrest front surface section 280*a* is configured to have the sound permeability higher than the sound permeability of the backrest rear surface section 280*b*. Therefore, it is possible to direct sound emitted by the extended enclosure 281 to the backrest front surface section 280*a* side and output the sound. It is possible to cause the seated person side to feel a satisfactory low tone.

Note that the first to fourth embodiments indicate forms applied with the present invention. The present invention is not limited to the first to fourth embodiments.

In the first to fourth embodiments, the control board 53 functioning as the heat generating body is explained as being mounted with the acoustic signal processing circuit, the control circuit for controlling the acoustic microphone 51, and the like. However, the present invention is not limited to this. The heat generating body only has to be a component concerning an electronic apparatus and may be, for example, a control board for controlling the operation of an electric seat or a sensor board incorporated in the headrest device 10.

In the fourth embodiment, the box-like extended enclosure 281 is explained as being provided on the inside of the backrest section 5. However, the present invention is not limited to this. For example, the backrest front surface section 280*a* may be formed of a porous skin or a material having high air permeability to have high air permeability without providing the extended enclosure 281. Substantially entire left and right side surfaces of the backrest rear surface section 280*b* and the backrest section 5 may be covered with a material having low air permeability such as a rubber material. In this case, it is possible to direct sound emitted by the backrest section 5 to the backrest front surface section 280*a* side and output the sound. It is possible to obtain an effect same as the effect obtained when the extended enclosure 281 is provided.

REFERENCE SIGNS LIST

1 Seat
5 Backrest section
10, 110 Headrest devices (acoustic devices)
11, 311 Frames (frame members)
12 Cushion core material (core material, headrest main body)
15, 15, 115, 115 Headrest stays
50, 50 Acoustic speakers
53 Control board (heat generating body)
70, 70, 170, 170, 370 Hollow sections
71, 171 Upper openings (communication holes)
72 Lower opening (communication hole)
172 Side surface opening (communication hole)
201 Seat (acoustic device)

The invention claimed is:

1. An acoustic device comprising:
a core material of a closed structure functioning as a core of a headrest main body, the core material having an inner space;
acoustic speakers communicating with the inner space of the core material and attached to the core material; and
hollow headrest stays that pierce through the core material, wherein
the hollow headrest stays are configured to be inserted into a backrest section of a seat to connect the headrest main body to the backrest section,
the inner space of the core material forms a sound chamber, air therein vibrating and reinforcing sound from the acoustic speakers,
at least one of the hollow headrest stays includes a hollow section including a first communication hole, which is opened to the sound chamber formed by the inner space, and a second communication hole, which is opened to an inside of the backrest section, so as to flow air from the sound chamber formed by the inner space of the core material to the inside of the backrest section via the hollow section, and
the first communication hole is located behind a vibration face of the acoustic speakers, and opens to an upper side of the hollow headrest stays.

2. The acoustic device according to claim 1, wherein the hollow headrest stays are a pipe shape and include the first and second communication holes for the air at ends or on side surfaces of the hollow headrest stays.

3. The acoustic device according to claim 2, wherein when the second communication hole is provided at the side surface of the hollow headrest stay, the end of the hollow headrest stay is closed, the air flows through the second communication hole at the side surface,
when the second communication hole is non-provided at the side surface of the hollow headrest stay, the end of the hollow headrest stay is non-closed, the air flows through the non-closed end.

4. The acoustic device according to claim 1, further comprising: an extended enclosure having a box shape and forming an inner space provided inside the backrest section, wherein
the inner space of the extended enclosure forms a sound chamber and air therein vibrates and reinforces sound from the acoustic speakers,
the second communication hole is opened to an inside of the sound chamber which is formed by the inner space of the extended enclosure, and the sound chamber formed by the inner space of the core material and the sound chamber formed by the inner space of the extended enclosure are connected through the hollow section of at least one of the hollow headrest stays.

5. The acoustic device according to claim 4, wherein the extended enclosure includes a port for discharging the air to a front surface side of the backrest section.

6. The acoustic device according to claim 1, wherein the acoustic speakers are provided as a pair on left and right, and
the hollow headrest stays are provided as a pair on the left and the right in positions close to the acoustic speakers.

7. The acoustic device according to claim 1, further comprising: a frame member made of metal provided on an inner side of the headrest main body, wherein
the frame member integrally includes the hollow headrest stays, and
a heat generating body is fixed to the frame member.

8. The acoustic device according to claim 7, wherein portions near the heat generating body in the hollow headrest stays are formed small in a sectional area.

9. The acoustic device according to claim 7, wherein the frame member is provided on an inner side of the core material and supports the core material, and
the hollow headrest stays include a space on the inner side of the core material to communicate with the outer side.

10. The acoustic device according to claim 7, wherein the heat generating body is an acoustic signal processing circuit for the acoustic speakers.

11. The acoustic device according to claim 1, wherein the acoustic speakers include a vibration plate in which a front face is directed toward a user side, and a rear face is directed toward an opposite side of the front face, and the first communication hole is positioned adjacent to the rear face of the vibration plate and is disposed in a position overlapping the acoustic speakers when viewed from the front face of the vibration plate.

* * * * *